United States Patent [19]

Schutten et al.

[11] Patent Number: 5,019,983

[45] Date of Patent: May 28, 1991

[54] AUTOMATIC STEERING APPARATUS USING REFLECTED SIGNALS

[75] Inventors: Herman P. Schutten, Bayside, Wis.; Dwight B. Stephenson, Savage; Oliver W. Johnson, Chaska, both of Minn.

[73] Assignee: Eaton Corporation, Cleveland, Ohio

[21] Appl. No.: 313,644

[22] Filed: Feb. 21, 1989

[51] Int. Cl.$^5$ .................... G06F 15/50; A01D 34/00
[52] U.S. Cl. ............................ 364/424.07; 56/10.2
[58] Field of Search .................. 56/10.2, DIG. 15; 364/424.01, 424.07, 424.02

[56] References Cited

U.S. PATENT DOCUMENTS

| | | | |
|---|---|---|---|
| 4,505,094 | 3/1985 | Demorest | 56/10.2 |
| 4,726,175 | 2/1988 | Day et al. | 56/10.2 |
| 4,835,691 | 5/1989 | Rotem et al. | 364/424.07 |
| 4,883,964 | 11/1989 | Bohman | 56/10.2 |
| 4,934,985 | 6/1990 | Strubbe | 56/10.2 |
| 4,967,362 | 10/1990 | Schutten et al. | 364/424.07 |

Primary Examiner—Parshotam S. Lall
Assistant Examiner—Thomas S. Auchterlonie
Attorney, Agent, or Firm—C. H. Grace

[57] ABSTRACT

Apparatus for automatically steering a farm crop vehicle between rows of corn by sensing the locations of the rows ahead of the vehicle. The apparatus senses the location of the plants as the crop vehicle approaches them. The data thus obtained are processed by an on-board microcontroller to determine the lateral location of the crop vehicle relative to the rows and provide a feedback signal. Another feedback signal is provided by integrating that lateral error data. In addition to the plant sensors, the harvester has a Doppler radar system on its left side that provides ground-velocity information for the left side, and a similar system on the right side. The radar outputs enable the microcontroller to measure the turning of the vehicle. This is used to produce yet another feedback signal that improves the automatic steering. This turning-feedback signal stabilizes the loop. The microcontroller provides steering commands for automatically tracking the rows.

6 Claims, 5 Drawing Sheets

AUTOMATIC STEERING APPARATUS USING REFLECTED SIGNALS

FIELD AND BACKGROUND OF THE INVENTION

1. Field

The invention relates to harvesting of crops that are planted in rows, such as corn and soybeans. A harvesting vehicle is steered automatically by sensing the locations of the rows of plants. Typically, corn is planted with a predetermined spacing of from 6 inches to 14 inches, in rows about 2½ feet apart. When the plants are harvested, a vehicle travels in a direction longitudinal of the rows of corn, automatically senses the lateral locations of at least one of the rows, and utilizes the information for fully-automatic steering or operator-assisted automatic steering.

Reference is made to a co-pending application of the same inventors and presently assigned to the same assignee as this application. It is: "Automatic Steering Apparatus For Crop Vehicle", Ser. No. 302,889, filed Jan. 30, 1989, now U.S. Pat. No. 4,967,362.

2. Background

Crop vehicles of this type commonly harvest twelve rows of plants simultaneously. As the vehicle is driven forward the plants in the rows are guided by twelve V-shaped guides at the front of the vehicle. The V-shaped guides shepherd the flexible plants into stripping or cutting bars mounted on the crop vehicle, where the ears of corn are stripped from their stalks or the plants are severed. The V-shaped guides are typically about five feet long, and their forward tips are about 2½ feet apart. The front of at least one of the V-guides is equipped with a pair of plant-contacting sensors. These feeler-type sensors are touched by the corn plants as they enter the V-guide. The contact sensors provide electrical signals that assist in the steering of the crop vehicle.

An example of only one of many prior art systems is one that can automatically assist the steering well enough to harvest corn satisfactorily from straight rows of plants, but is unable to steer very accurately where the rows are curved. Typical requirements include being able to track down to a 50-meter turning radius, at 5 mph, with a 20"-wide interception "window" for each row of plants. For steering purposes that particular prior art system relies upon information as to the magnitude of deflection of each of two plant-contacting sensors (a right-hand sensor and a left-hand sensor, at the front of the same V-guide).

The reason that the prior vehicle does not automatically follow curved rows of plants very well is that a relatively large error (i.e., lateral offset of the vehicle from the optimum travel path) has to develop before a sufficient corrective steering command is produced. This defect cannot be corrected by merely designing the closed feedback loop with higher gain and providing an integral feedback term in the steering control system because the system then becomes unstable.

To improve its steering, the prior art system referred to above employs a bias signal that is controlled manually. When the vehicle enters a turn the operator is required to turn a knob to add enough bias signal to keep the crop vehicle lined up with the rows of crop. Needless to say it is inconvenient for the operator to have to assist the automatic steering system in this way.

SUMMARY

Problem Solved By the Invention

As a guided harvesting vehicle drives along parallel to the crop rows it may depart from the optimum path (in which the V-guides would be centered laterally on the rows) and/or become headed in an incorrect direction. The problems of automatic guidance are (a) to sense the present locations of the rows relative to the vehicle and to anticipate the future locations; (b) to determine the best angle for the steerable wheels at that moment to place the vehicle on the optimum path with the proper heading as quickly as possible; (c) to supply control signals and an actuator to accomplish that steering; and (d) to provide high-enough stable loop gain to keep the vehicle tracking the rows accurately.

General Approach

The invention described herein senses the geometry of the vehicle's situation, turns the wheels in the direction of the optimum path, and turns them back in time to get on the optimum path.

The invented apparatus is a type of guidance system that employs both plant sensors and reflected waves such as radar signals for sensing the location, speed, and turning rate of the vehicle. The following brief overview of what the guidance system does applies to both straight and curved segments of the crop rows.

(a) It ascertains the lateral position of the vehicle relative to the crop rows by obtaining relative lateral-position data from plant sensors on one or more of its V-guides.

(b) It anticipates changes in the vehicle's near-future position by ascertaining the velocity and the rate of change of heading of the vehicle. This is accomplished by measuring the velocities of two spaced-apart points on the vehicle, using Doppler radar devices or other reflection devices, and determining the difference between the two velocities. The devices are preferably mounted on the right and left of the vehicle, and directed forward (or backward) and somewhat downward toward the ground. The information that they provide is utilized in controlling the steering.

DETAILED DESCRIPTION OF THE PREFERRED EMBODIMENT

Vehicle and Crop Rows

Figure 1:
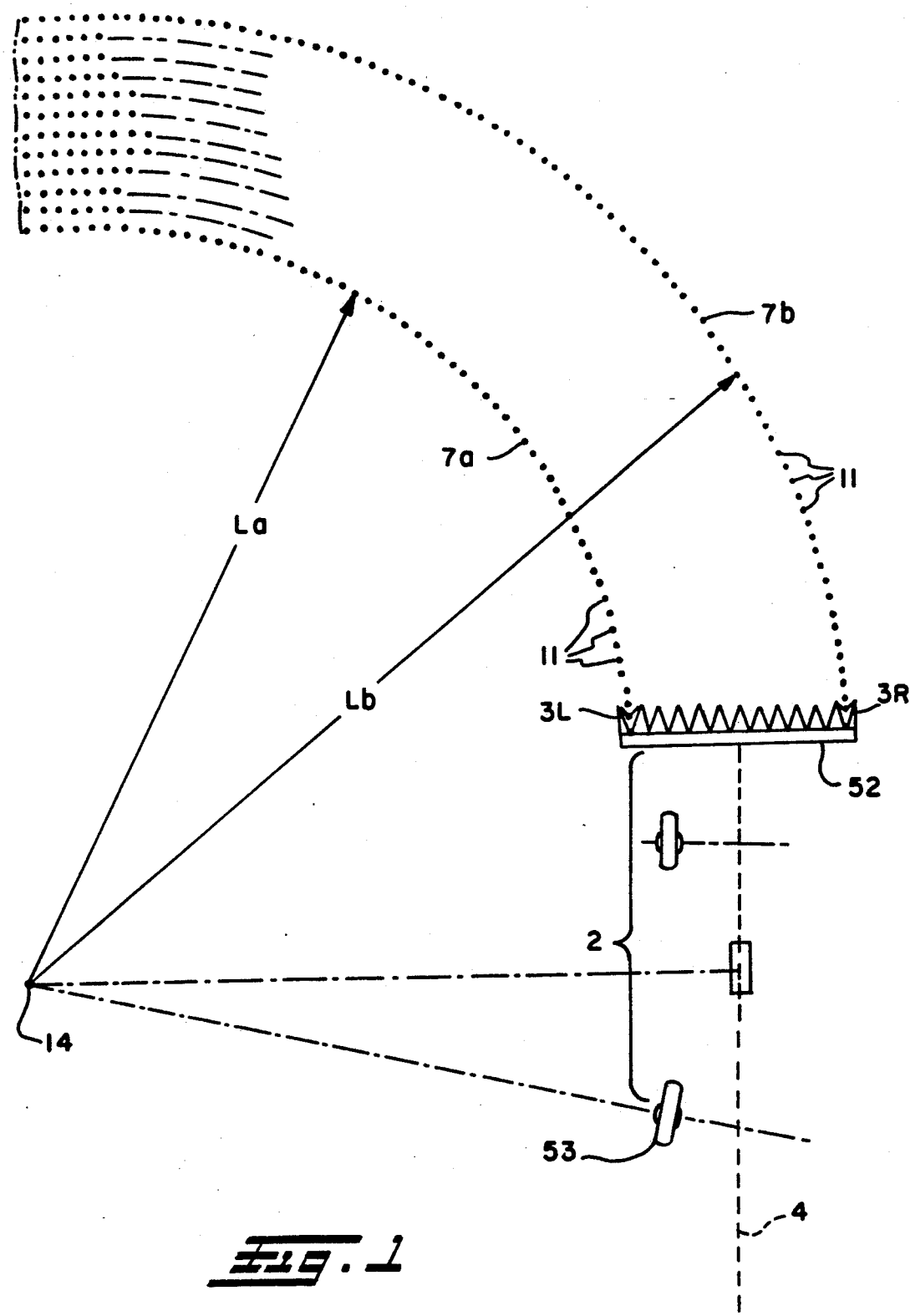
FIG. 1 is a simplified diagram of a crop vehicle as it approaches a turn in rows of plants that it is harvesting.

FIG. 1 shows a corn harvesting crop vehicle 2 traveling on an optimum path 4 toward twelve rows, 7a to 7b, of corn plants 11 extending from the left side 3L of the vehicle's harvesting attachment ("header") to its right side 3R. The rows are straight for a part of their path on the lower half of FIG. 1 and are curved leftward on the upper half of FIG. 1. The crop vehicle 2 has two steerable rear wheels 53 that are controlled by a hydraulic steering cylinder 56 (shown elsewhere). The approximate center of curvature of the curves of the left and right rows is a point 14. FIG. 1 also symbolically indicates the header device 52 that strips the ears of corn from the stalks when the vehicle arrives at them.

V-Guides and Sensors

Figure 2A:
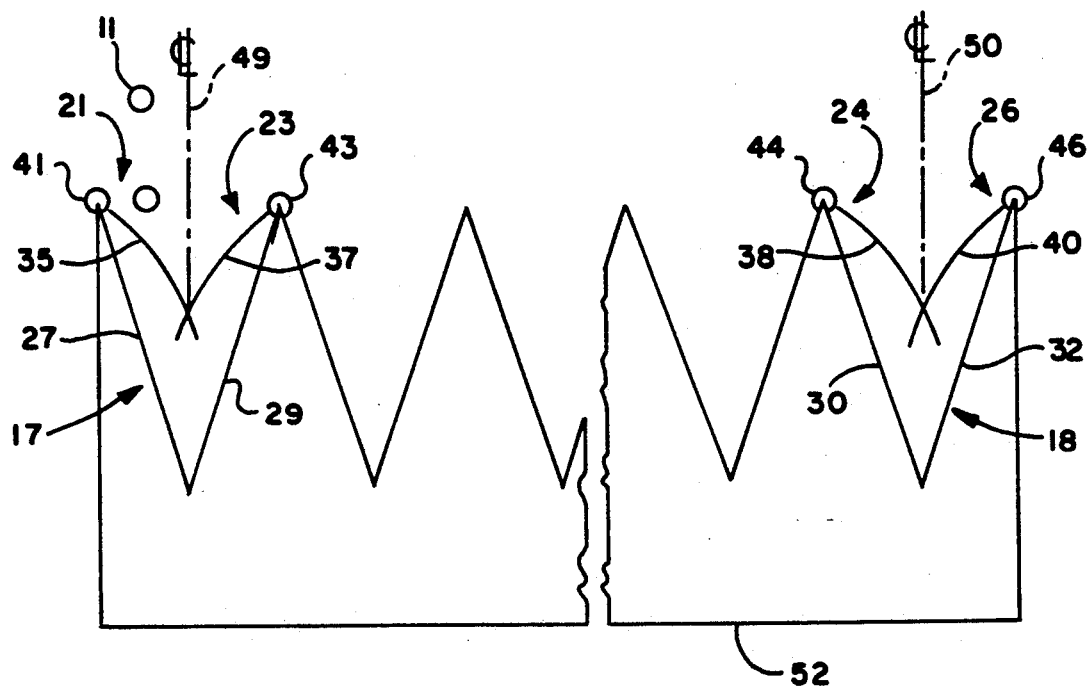
FIG. 2A is a simplified diagram of V-guides, two of which are equipped with a pairs of plant-contacting sensors.
Figure 2B:
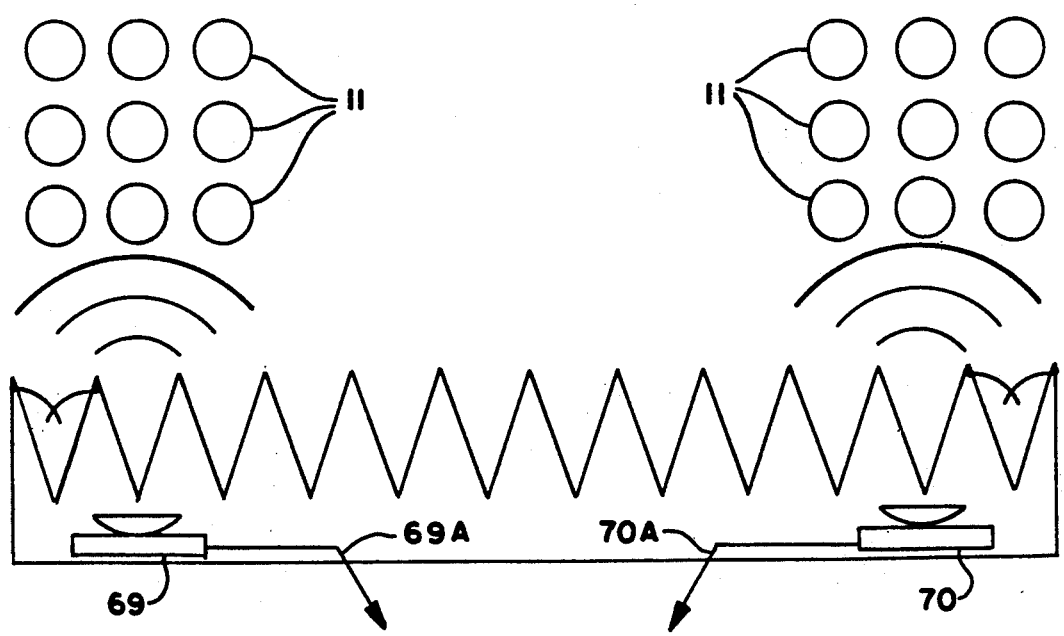
FIG. 2B is a simplified diagram of a V-guide assembly with two radar velocity sensors mounted above it at separated locations.

V-guides (one for each of the twelve rows), are mounted on the crop vehicle 2, as shown in FIGS. 1, 2A, and 2B. The extreme left-hand and right-hand V-guides are numbered 17 and 18 respectively. FIG. 2A shows contact-type plant sensors 21, 23, which are provided on each leg 27, 29 of the extreme left V-guide 17; similar sensors 24, 26 are on the legs 30, 32 of the extreme right V-guide 18. The plant sensors in this particular embodiment utilize spring-loaded potentiometers 41, 43, 44, 46 mounted on the left and right forward tips of the V-guides 17, 18.

A contact arm 35, 37, 38, 40, about two feet long extends from each potentiometer toward and past the centerline 49, 50 of its V-guide. The contact arms are slightly curved, pointed backward, and long enough that a pair of them forms a shallow X shape. When they encounter corn plants they are deflected backward, rotating the potentiometer shafts to which they are connected.

When a plant 11 deflects the contact-sensor arm 35, a change in resistance of the energized potentiometer 41 provides a signal indicating the presence and approximate relative lateral position of the plant 11. Deflection signals from potentiometers 41, 43, 44, 46 and related apparatus are denoted by $L_L$, $L_R$, $R_L$, and $R_R$ respectively.

Signal Processing and Automatic Control

The potentiometer signals are processed by simple routine signal-processing circuits 59, 61, 62, 64 (FIG. 3), to put them in forms which are acceptable as input data to a microcontroller 66. Within circuit 59, the deflection signal due to each plant is converted to a pulse of standardized amplitude and duration by a conventional threshold device 100 that ignores low-level noise, and a pulse train $L_L$ is output from circuit 59 to the microcontroller 66. Similarly, circuits 61, 62, and 64 send pulse trains $L_R$, $R_L$, and $R_R$ to the microcontroller 66, which uses them for various purposes including missing plant detection, initiation of automatic guidance upon entry of the vehicle into a field, etc., some of which need not be described herein.

The peak amount or level of each deflection of a sensor is converted to a digital signal in an analog-to-digital converter such as ADC 101, and is transmitted from circuits 59, 61, 62, 64 to microcontroller 66 on lines 151, 153, 154, and 156 respectively. These transmitted level data are referred to as $L_L$-level, $L_R$-level, $R_L$-level, and $R_R$-level.

The data are then processed and interpreted by the microcontroller 66. The microcontroller 66 includes a clock oscillator CLK that enables it to ascertain the time between occurrences of plant-contact pulses.

One contact sensor alone, such as sensor 21, would be able to sense a left or right deviation of the vehicle from an optimum path; the four contact sensors of this apparatus provide redundant lateral-position data that are combined in the microcontroller, preferably by averaging, but alternatively by selection in pairs, to improve steering accuracy.

The microcontroller 66 outputs control commands to a circuit 68, which processes and amplifies them, and provides them to the steering cylinder 56 and its associated control equipment as in prior art. In response, the steering cylinder 56 steers the steerable rear wheels 53 in such a direction as to center the crop rows in the V-guides. This reduces the lateral error signals.

Information Received From The Contact Sensors

When the vehicle starts to diverge from the optimum path 4, the quantitative "level" signals from the V-guide's contact sensors 21, etc. provide lateral-position error information.

Figure 4:
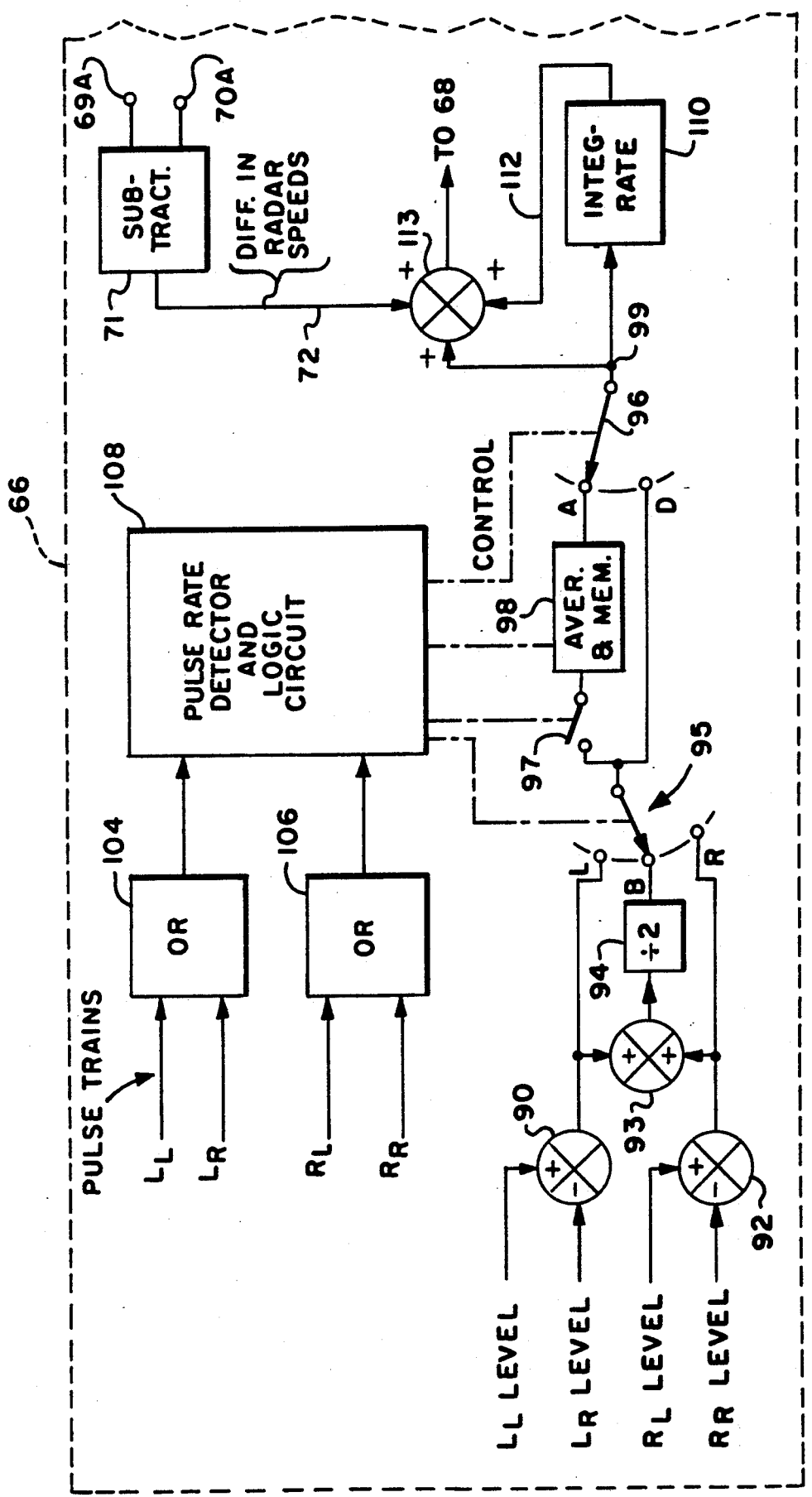
FIG. 4 is a block diagram of some functions of a microprocessor, represented symbolically by electronic hardware equipment that processes signals received from V-guide sensors and from reflection devices, for guiding the crop vehicle while it is operating in a field.

FIG. 4 illustrates (in partially-analog form for clarity), the relevant digital functions that are performed by the microcomputer 66 on this information. The difference between magnitudes of the $L_L$ and $L_R$ signal levels is taken at a subtractor 90, and the difference between magnitudes of the $R_L$ and $R_R$ signal levels is taken at a subtractor 92.

The two differences are averaged by adding them at 93 and dividing the sum by two at 94. Alternatively, one or the other of the differences can be selected, as indicated symbolically by a three-position switch 95 on FIG. 4. Switch position L has the left-hand difference level; position R has the right-hand difference level, and position B has both the left and right (average). The selector switch 95 is controlled by logic in the pulse rate detector 108 in dependence upon whether the left sensors or the right sensors or both are detecting plants and therefore producing pulse trains.

The selected level-signal difference at the output of switch 95 is connected directly to one pole D of a two-position "selector switch" 96, and is also passed through a single-pole switch 97 to a running-averaging shift register 98. The switch 97 is closed by action of pulse detector 108 whenever pulses are present at the left (104), the right (106), or both channels, (further described below). All of the logic functions of block 108 can be performed in any of several simple ways by routine programming of the microprocessor 66, using techniques that are well known in the prior art.

The pulse rate detector 108 also controls the averaging circuit and memory 98, which serves as a low-pass filter and memory. Block 98 constantly computes a running average of level signals and stores and outputs its most recent running average. It is a shift register whose individual stage contents are averaged, to provide a single output. When the pulse detector 108 senses that the pulses have stopped altogether, signifying that no plants are being encountered, the detector 108 operates the switch 96 to position A. That places the averaging and memory device 98 in the circuit, which outputs its stored recent-average information to enable the automatic steering system to keep the harvester on a recent-average course.

Under control of the circuit 108, switch 96 selects the output of the register 98 (at the A position of switch 96) when all trains of pulses are absent, and selects the direct output of switch 95 (at the D position of switch 96) when any pulse train or trains whatsoever are being received by the detector 108.

The row-error signal at terminal 99, which is the output of switch 96, is indicative of the lateral deviation of the vehicle from the optimum path.

Figure 3:
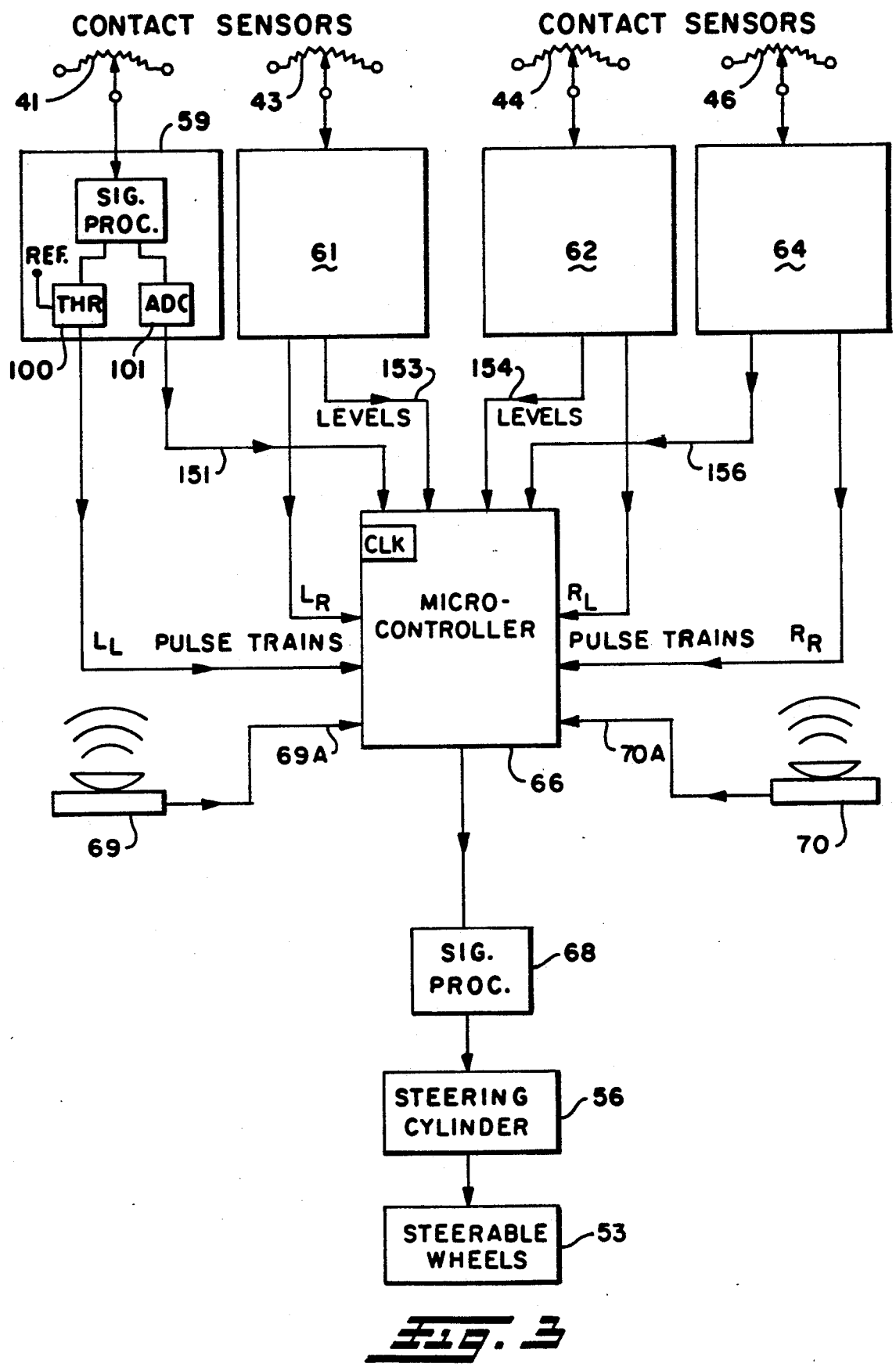
FIG. 3 is a block diagram of major components of a steering system and signal flow among them for automatic guidance of the crop vehicle.

In FIGS. 3 and 4 the occurrence of any level of deflection signal above a noise threshold is interpreted as a plant-contact event by the threshold device 100. The presence of either a pulse signal $L_L$ or a pulse signal $L_R$ results in an event signal at the output of an OR logic device 104, which signifies that a plant of row 7a has been detected at the left-hand V-guide 17. Similarly, the arrival of the right-hand V-guide 18 at a plant in row 7b results in an event signal, namely a pulse, at the output of an OR gate 106. A succession of plant contacts results in a pulse train, which is used by block 108 to ascertain which sensors are producing signals.

Reflection Devices

Speed sensors such as Doppler radar devices are mounted at the left and right sides of the vehicle to measure the forward speed of each side. They are indicated on FIGS. 2B and 3 by reference numerals 69 and 70. In FIG. 2B the Doppler radar device 69 transmits radar waves forward toward the earth, in the embodiment being described. Some of the transmitted wave energy is reflected back to the device 69 from the earth. If the radar devices look in the direction of travel, the reflected waves are received with slightly higher frequencies than the transmitted frequencies because of the relative forward motion of the device 69 and the earth from which reflections occur.

At radar device 69, the frequency difference between transmitted and received reflected waves, i.e., the Doppler shift, provides an estimate of the rate of closure, which is the forward speed of the part of the harvesting vehicle on which the device 69 is mounted. A signal corresponding to the forward speed of that left-hand part of the vehicle is communicated on lines 69A to the microcontroller 66.

Similarly, the radar device 70 measures the forward velocity of the right-hand part of the vehicle, on which it is mounted, and provides a velocity signal on lines 70A to the microcontroller 66. Doppler radar equipment for measurement of vehicle speed is well known and inexpensive.

Turning Feedback

A turning signal is provided based on the difference in the velocities of the left- and right-hand sides of the vehicle with respect to earth (not with respect to the rows of plants). It indicates the actual angular velocity or rate of change of direction of the vehicle. This enables a special form of rate feedback. It is used by the microcontroller 66 to improve the automatically-assisted steering of the vehicle, as will now be described.

To provide a turning signal, the microcontroller 66 subtracts the speed signal on lines 69A from the speed signal on lines 70A. The subtraction function, which is preferably performed by software, is symbolized by the block 71 of FIG. 4.

The vehicle's steering is controlled primarily by the lateral position signals described above. The output of subtractor 71 is therefore also roughly proportional to the curvature of the group of crop rows that the vehicle is harvesting, i.e., of the path 4.

Thus, although they are not responsive to the rows of plants themselves, the radar devices detect a parameter that is related to the curvature of the rows. This is true because (a) the crop rows provide lateral signals via the touch sensors, and (b) the vehicle steers accordingly over the earth to track the rows, and (c) the radar devices measure that turning with respect to the earth.

The Directly Controlled System

The following is a simplified description of what the steering behavior of the vehicle would be if there were no feedback. When the vehicle is traveling and the steerable rear wheels 53 are turned off center, the vehicle starts to rotate (relative to the earth) about a vertical axis near its front wheels, which act as a fulcrum. Also the vehicle as a whole starts traveling on an arcuate course about the point 14 of FIG. 1.

The header device 52 is at the front of the vehicle, ahead of the front wheels. The lateral position of the header device 52 is the integral of the angular position of the steerable wheels 53. This means that after the steerable wheels are turned to a particular angle the vehicle must travel a distance before the effect of that turning manifests itself significantly as a lateral displacement of the header 52.

The relationship between the lateral displacement of the header 52 and the angular position of the steerable wheels 53 can be thought of as the forward transfer function of the vehicle. This vehicle forward transfer function introduces a substantial phase shift (lag) into the control system because the lateral displacement of the header 52 is proportional to an integration of the angular position of the steerable wheels 53, as stated above.

Feedback Control

In this feedback control system the controlled variable is the lateral displacement of the header 52 from the crop rows. The objective is to maintain zero lateral displacement, which keeps the crop rows in the centers of their respective V-guides. Three negative feedback signals are utilized to close the servo loop.

The first of the three feedback signals is a proportional signal provided by the sensors 21 etc., which continually measure the lateral displacement of the header 52 relative to the crop rows. They provide the lateral displacement error signal (at terminal 99 of FIG. 4).

The second of the three feedback signals is an integral signal obtained by integrating the lateral displacement error signal (99). This is done in the integrator 110, which cumulatively builds up a corrective feedback signal at its output 112, FIG. 4. The integral feedback signal is intended to eliminate the offset or steady-state error.

The third feedback signal is a derivative signal, but it is not a derivative of the proportional signal 99 itself. Instead it is an earth-referenced turning-rate signal, which depends upon the turning of the vehicle relative to the earth, (not relative to the crop rows). This signal indicates the angular velocity of the vehicle, and is provided at terminal 72 by the radar subsystem. It stabilizes the system by compensating for the phase shift that occurs in the forward transfer function of the vehicle.

In the embodiment being described the three feedback signals are combined in an adder, which is symbolized by the summing junction 113 of FIG. 4. Programming techniques for signal processing of this type in a computer such as the microcontroller 66 are well known and routine.

The radar velocity-difference apparatus (which measures the vehicle's angular velocity relative to the earth) provides almost immediate information about a turn of the vehicle, and quickly introduces a stabilizing correction signal into the steering control system. No manual adjustment or other operator intervention is necessary.

Performance Benefits of Turning Feedback When On Curved Rows

Figure 5:
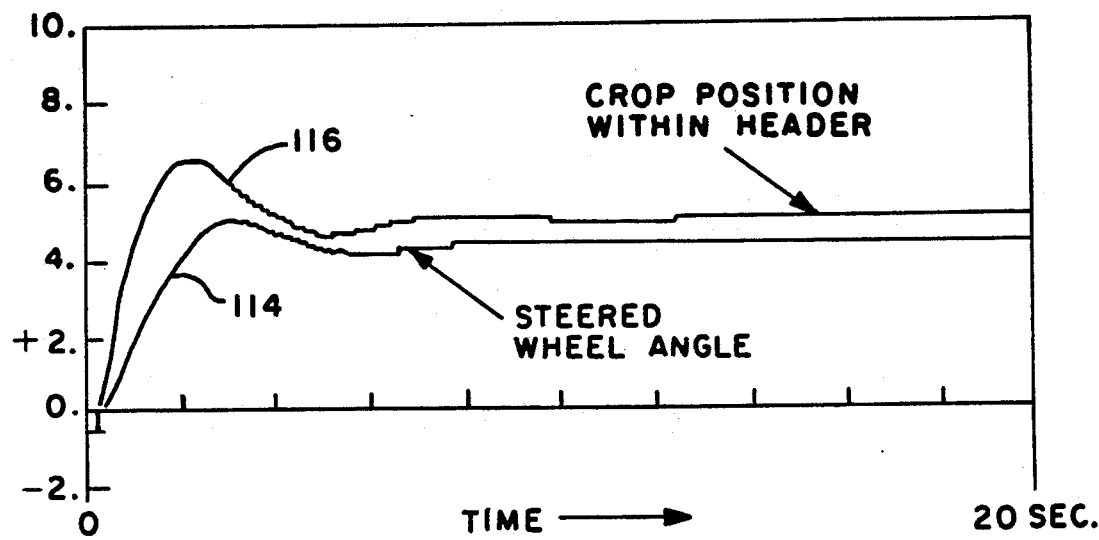
FIG. 5 is a position-vs-time graph showing simulated performance of a prior guidance system as a crop vehicle goes around a curve, when the system has no curve-correction equipment.
Figure 6:
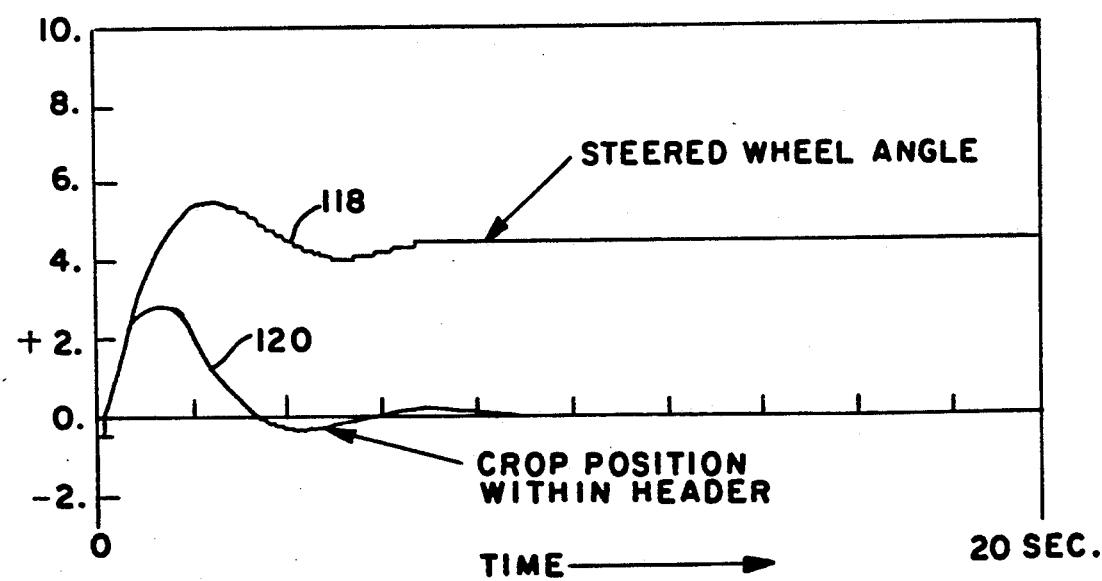
FIG. 6 is a similar position-vs-time graph showing simulated performance, on a curved row, of the invented system, which has curve-correction equipment.

FIG. 5 and FIG. 6 are "before and after" curves showing a beneficial effect of the curve-correction and stabilization capability. In FIG. 5 the angular position of the steered wheels 53 is plotted as a function of time, as curve 114. This graph was obtained from a computer simulation of the guidance system, but without the invented curve-correction and stabilization capability. The vehicle was assumed to be tracking along a straight segment of rows, and to arrive at time zero at a turn of the rows. The rows became off-center in the V-guides, producing error signals, and the steered wheels were automatically turned accordingly, to attempt to continue tracking the rows.

The crop position within the V-guides is shown as curve 116. Note that in FIG. 5 the crop position became offset from center, (the horizontal zero line of the graph) and remained offset; this lateral offset represents error, i.e., poor tracking. The gain of the feedback loop cannot be made great enough to enable the lateral offset error to be smaller without incurring instability, when the invented curve-correction and stabilization is not provided in the guidance equipment.

In FIG. 6 the curve-correction and stabilization feature (based on turning-signal feedback) was provided in the guidance equipment. In this simulation, the vehicle was again traveling along a straight segment of rows, then encountered a curve at time zero. As before, the steered wheels 53 turned in response to lateral position error signals as shown in curve 118. The wheels 53 remained in turned positions throughout the turn.

The crop position within the V-guides is shown as curve 120 (FIG. 6). It exhibits a transient error when the turn starts, but returns to zero offset error after six seconds and remains at zero error throughout the turn. This is because (a) a turning signal was developed at the terminal 72 (FIG. 4), that was fed back to steer so as to help correct the crop position error, and (b) the turning signal made possible a higher stable gain in the feedback loop as a whole, so that intensive negative feedback was available to reduce the error vigorously.

The improvement due to the curve-correction and stabilization performance of the invention can be seen by comparing curves 116 and 120 relative to the zero level of the graphs.

BREADTH

With appropriate modifications the invented system can of course be used as well for various other types of crops. A "header" device, in a form that permits it to be conveniently plugged into the control system, is provided for storing variable parametric information for specifying and controlling the system. It preferably contains only crop-related information.

The speed sensors that are referred to above as Doppler radar devices can instead be laser, sonar, infra-red, or other types of reflection devices. It is not essential that the plant sensors be potentiometers, or that they indicate the amount of their deflection.

Although a microcontroller utilizing software is employed in the embodiments that are described, the invention can be practiced instead by means of analog hardware or digital hardware without software. Many other variations are also possible within the scope of the inventive concepts, which is described by the claims.

We claim:

1. A steering system that automatically steers a vehicle to track rows of spaced-apart plants, comprising:
   plant sensor means on the vehicle for sensing said plants when the vehicle encounters plants and for providing signals thereupon:
   means for ascertaining from said signals of said plant sensor means the lateral position of said vehicle relative to said plant rows and providing lateral-position information signals;
   integration means for receiving and integrating said lateral-position information signals and providing integrated signals;
   wave transmission and receiving means for ascertaining, from reflections of transmitted waves, the speeds of parts of the vehicle relative to the ground, comprising:
      at least two means spaced apart laterally of the vehicle, which transmit said waves toward and receive reflected waves from the ground, for measuring the ground speeds of their respective locations on the vehicle and for providing ground-speed signals accordingly;
   processing means utilizing said ground-speed signals for determining speed-difference information between said locations on the vehicle of said means for measuring the ground speeds of their respective locations;
   means for combining said lateral-position information signals and said integrated signals and said speed-difference information to provide steering command signals;
   actuator means receiving said steering command signals and responsive thereto for orienting the steerable wheels of said vehicle proportional to said steering command signals and thus steering said vehicle to follow a course along said rows.

2. A steering system as in claim 1 and wherein said wave transmission and receiving means comprise Doppler radar means.

3. A steering system as in claim 1 and wherein said means for combining comprises means for adding.

4. A steering system that automatically steers a vehicle to track rows of spaced-apart plants, comprising:
   plant sensor means on the vehicle for sensing said plants when said vehicle encounters them and for providing signals thereupon;
   means for ascertaining the lateral position of said vehicle relative to said plant rows by obtaining lateral-position-information signals from said plant sensor means;
   means for integrating said lateral-position-information signals to provide integrated signals:

means for transmitting waves toward laterally-spaced-apart areas of the earth and receiving reflected waves therefrom;

means for processing said received reflected waves to provide signals regarding the rate of change of heading of the vehicle relative to the earth;

means for processing (a) said lateral-position-information signals and (b) said integrated signals and (c) said signals regarding the rate of change of heading, to provide steering command signals;

actuator means receiving said steering command signals and responsive thereto for orienting the steerable wheels of said vehicle proportional to said steering command signals and thus steering said vehicle;

whereby said vehicle tracks said rows.

5. A steering system as in claim 4 and wherein said means for transmitting and receiving waves comprises Doppler radar means.

6. A steering system as in claim 4 and wherein said means for processing comprises means for adding.

* * * * *